（12）United States Patent
Gong et al.

(10) Patent No.: US 11,076,459 B2
(45) Date of Patent: Jul. 27, 2021

(54) LED LIGHTING DEVICE FOR PREVENTING FLICKERING

(71) Applicants: Myeong-Kook Gong, Yongin-si (KR);
Da-Young Gong, Yongin-si (KR)

(72) Inventors: Myeong-Kook Gong, Yongin-si (KR);
Da-Young Gong, Yongin-si (KR)

( * ) Notice: Subject to any disclaimer, the term of this patent is extended or adjusted under 35 U.S.C. 154(b) by 0 days.

(21) Appl. No.: 16/757,227

(22) PCT Filed: May 18, 2018

(86) PCT No.: PCT/KR2018/005744
§ 371 (c)(1),
(2) Date: Apr. 17, 2020

(87) PCT Pub. No.: WO2019/083110
PCT Pub. Date: May 2, 2019

(65) Prior Publication Data
US 2020/0281057 A1    Sep. 3, 2020

(30) Foreign Application Priority Data

Oct. 26, 2017    (KR) ......................... 10-2017-0139928

(51) Int. Cl.
*H05B 45/00*    (2020.01)
*H05B 45/14*    (2020.01)
(Continued)

(52) U.S. Cl.
CPC ............ *H05B 45/00* (2020.01); *H05B 45/14* (2020.01); *H05B 45/3725* (2020.01); *H05B 45/48* (2020.01)

(58) Field of Classification Search
CPC ........ H05B 45/48; H05B 45/10; H05B 45/20; H05B 45/36; H05B 45/37; H05B 45/44;
(Continued)

(56) References Cited

U.S. PATENT DOCUMENTS

2012/0081009 A1*    4/2012    Shteynberg ............ H05B 45/48
315/122

FOREIGN PATENT DOCUMENTS

KR    10-1357636 B1    2/2014
KR    10-2014-0100390 A    8/2014
(Continued)

*Primary Examiner* — Monica C King
(74) *Attorney, Agent, or Firm* — Lewis Roca Rothgerber Christie LLP

(57) ABSTRACT

The present inventions presents an LED lighting device for preventing flickering. The device comprises: a rectification unit receiving an alternating current voltage applied from an alternating current power source and rectifying the same so as to output a direct current; a first light-emitting unit receiving the direct current applied thereto and adjusting a first constant current so as to make a first LED array emit light; a second light-emitting unit receiving the adjusted first constant current applied thereto and adjusting a second constant current so as to make a second LED array emit light; and a serial switching unit receiving the direct current and the adjusted first and second constant currents applied thereto so as to control current transmission according to the opening/closing of a plurality of embedded transistors, wherein the direct current and the first constant current, which are to be applied, are applied by passing through first and second diodes, respectively.

15 Claims, 8 Drawing Sheets

(51) Int. Cl.
*H05B 45/48* (2020.01)
*H05B 45/3725* (2020.01)

(58) Field of Classification Search
CPC ........ H05B 45/46; H05B 45/50; H05B 33/08;
H05B 45/14; H05B 45/3725; H05B 47/10
See application file for complete search history.

(56) References Cited

FOREIGN PATENT DOCUMENTS

| | | |
|---|---|---|
| KR | 10-1618544 B1 | 5/2016 |
| KR | 10-1635549 B | 7/2016 |
| KR | 10-2016-0125241 A | 10/2016 |
| KR | 10-1778494 B1 | 9/2017 |

* cited by examiner

[FIG. 1]
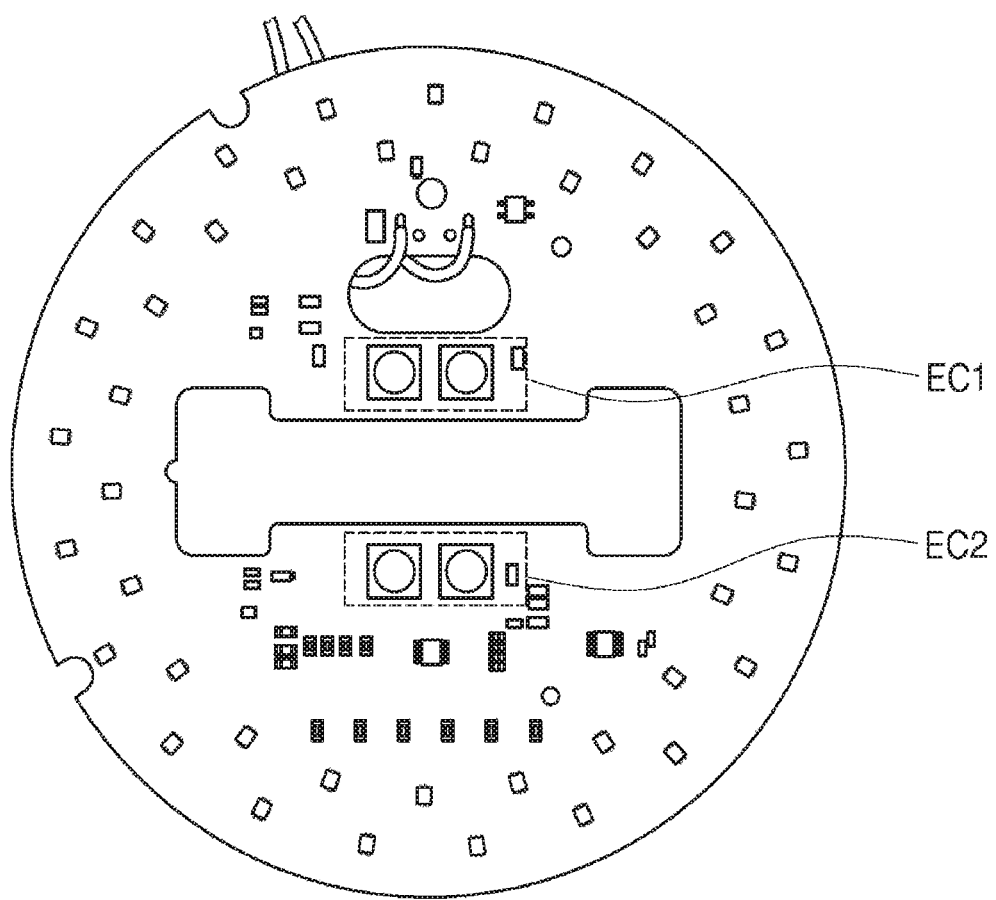

[FIG. 2]
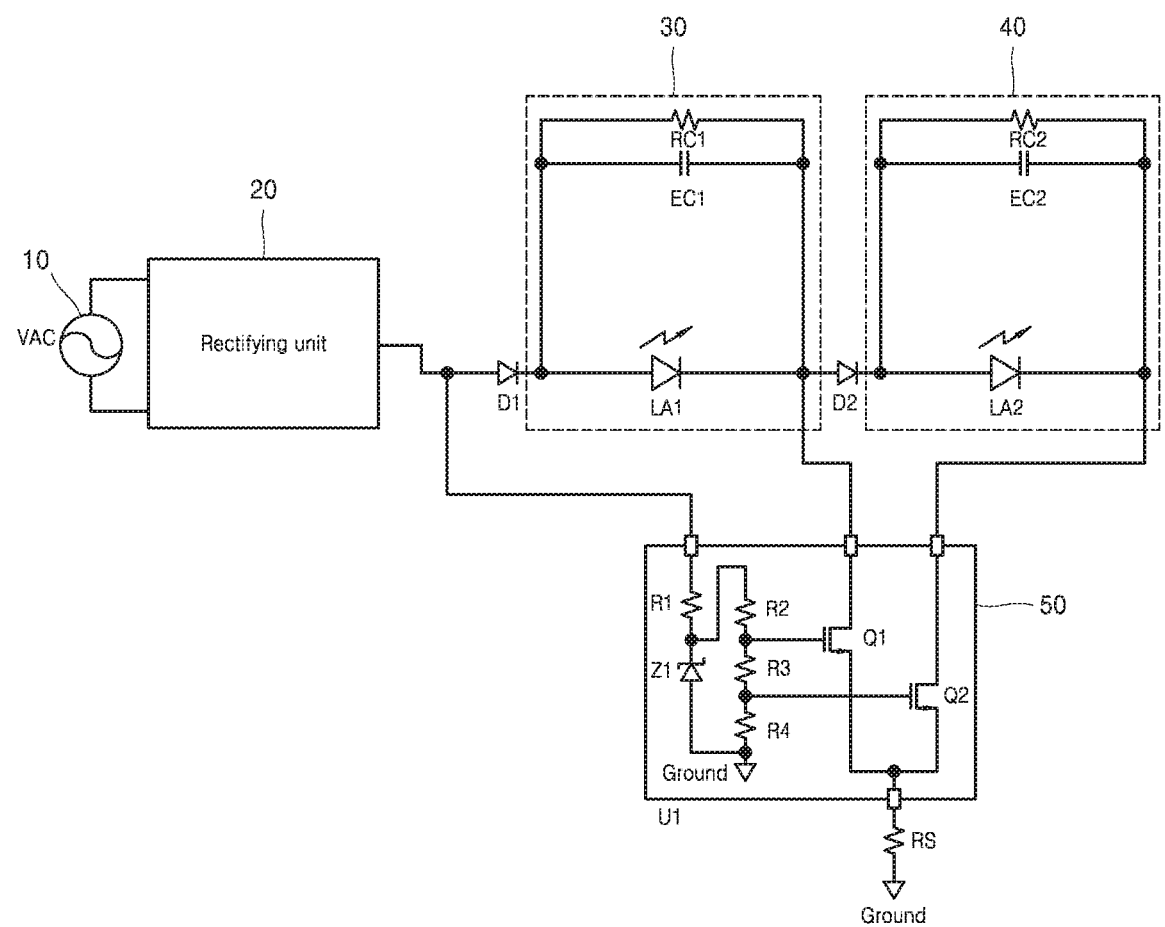

[FIG. 3]
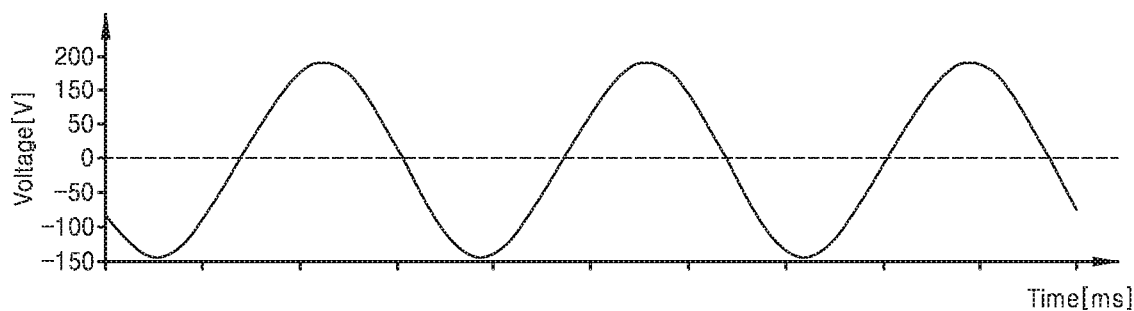
[FIG. 4]
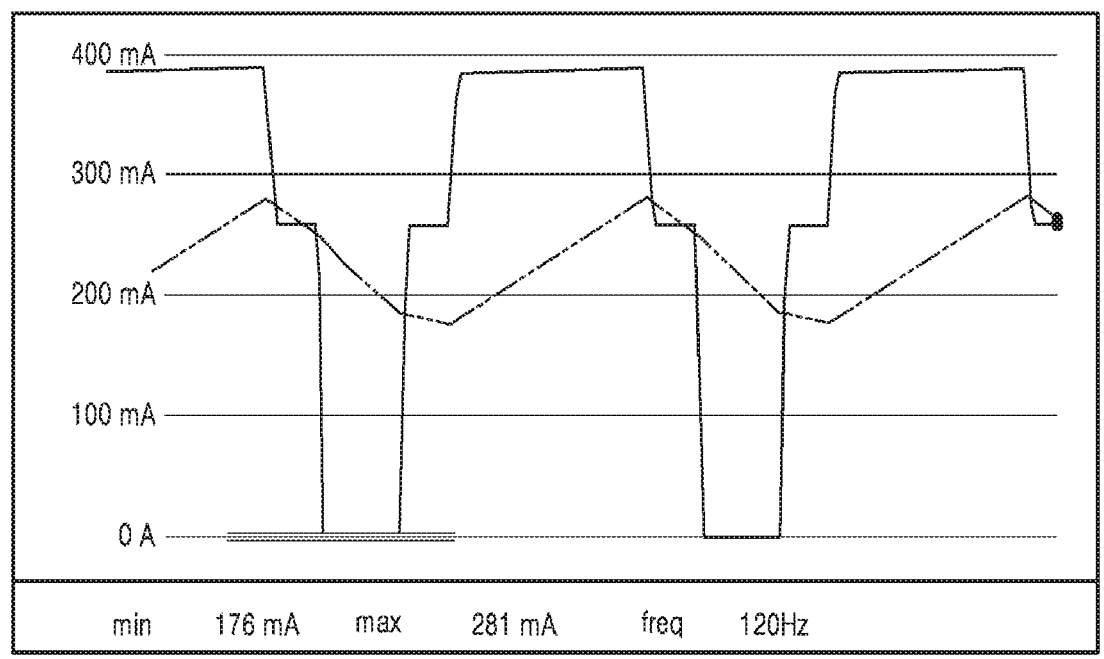

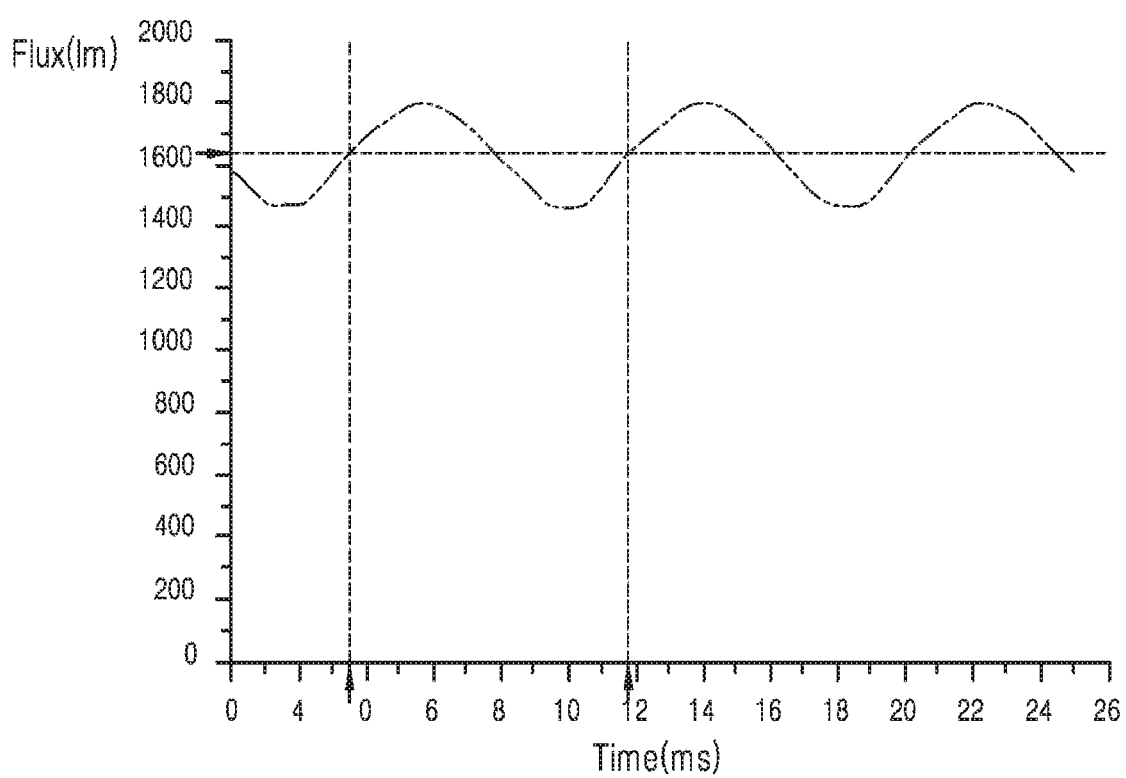
[FIG. 5]

[FIG. 6]
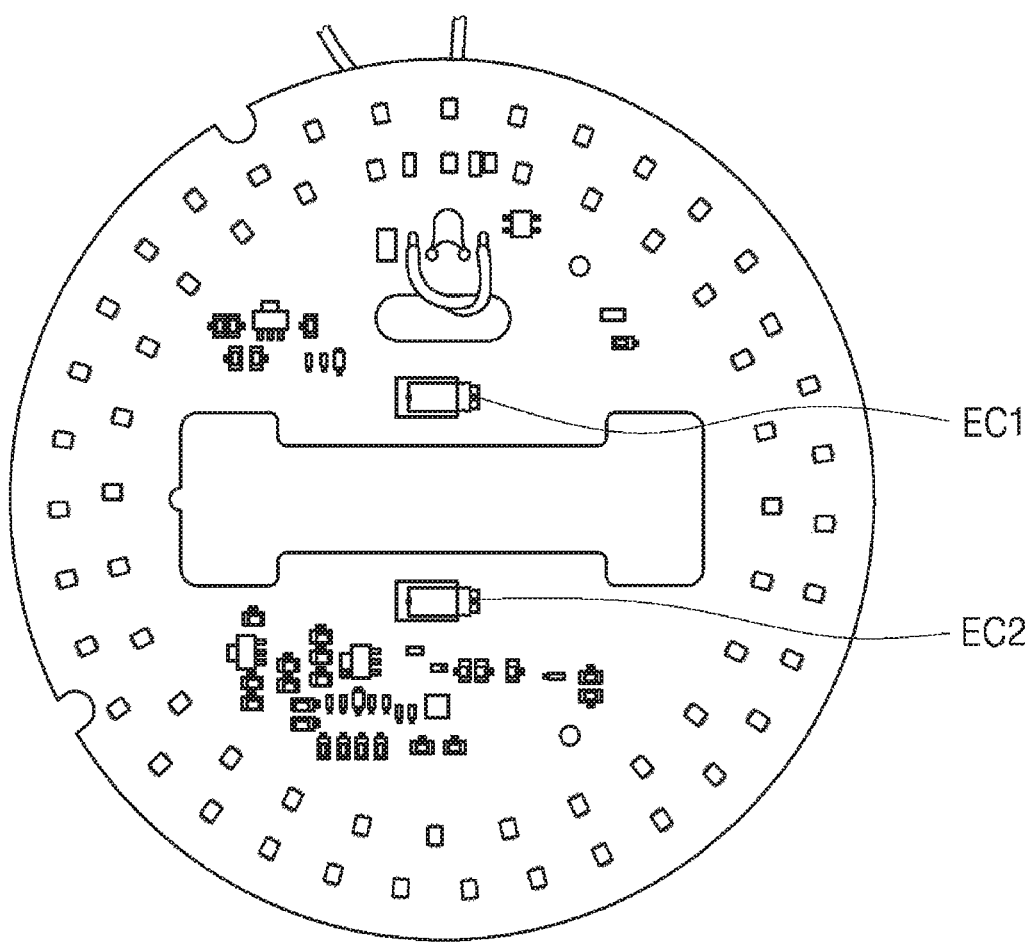

[FIG. 7]
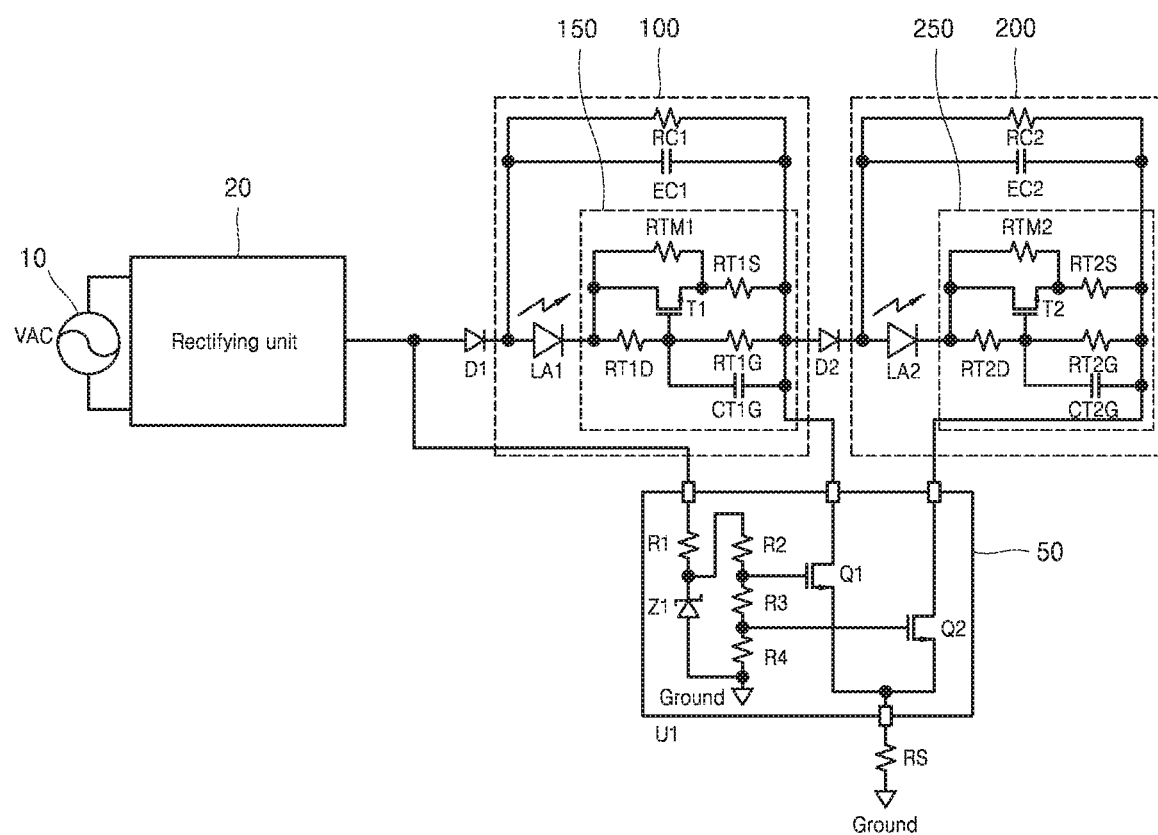

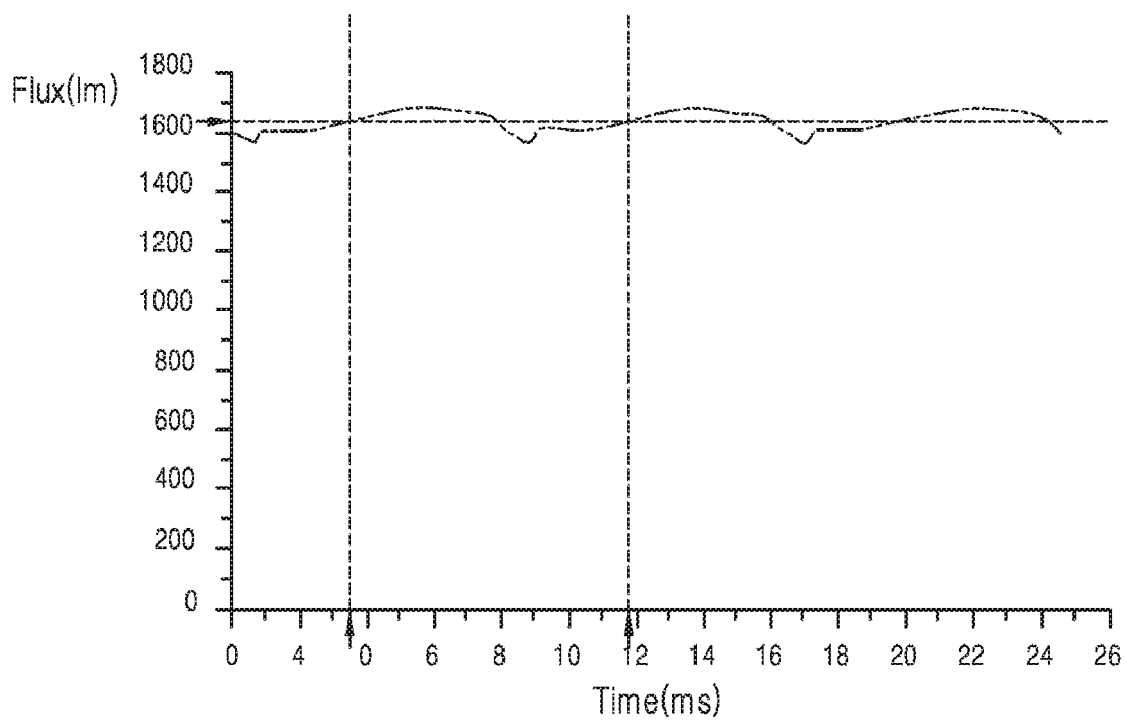
[FIG. 8]

[FIG. 9]
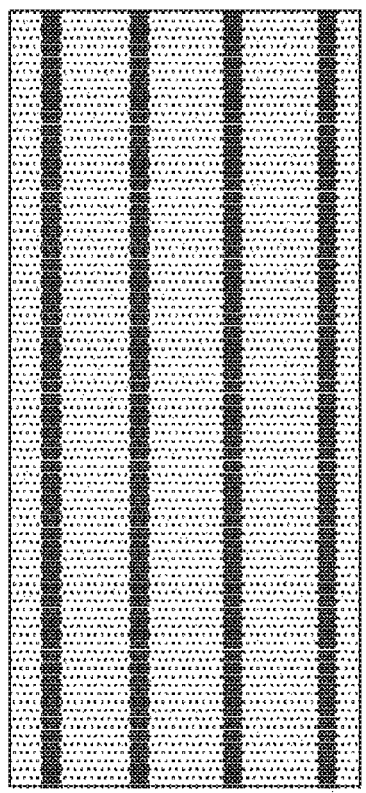
(a)
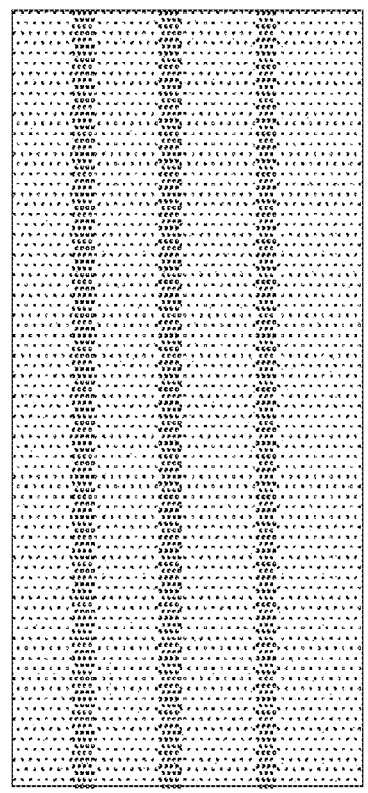
(b)
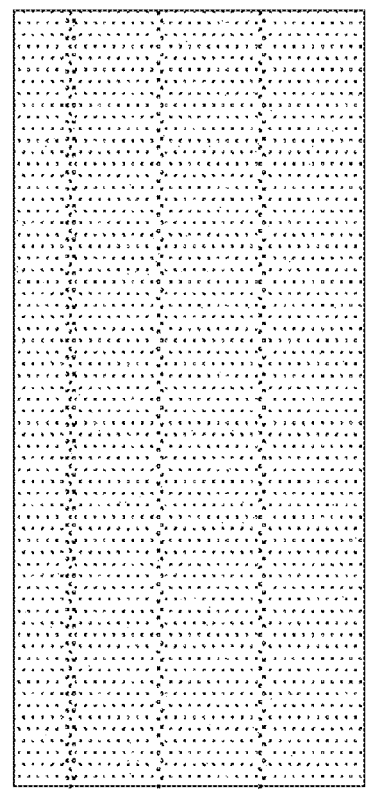
(c)

LED LIGHTING DEVICE FOR PREVENTING FLICKERING

CROSS-REFERENCE TO RELATED APPLICATIONS

This application is a National Phase Patent Application of International Patent Application Number PCT/KR2018/005744, filed on May 18, 2018, which claims priority of Korean Patent Application No. 10-2017-0139928, filed Oct. 2, 2017, the entire contents of both of which are incorporated herein by reference.

TECHNICAL FIELD

The present disclosure relates to an LED lighting device, and particularly to an LED lighting device for preventing a flicker that can reduce current ripples caused in an AC power supply of the LED lighting device by adjusting a constant current in a light-emitting unit, thereby preventing a flicker without increasing the number and capacity of electrolytic capacitors, preventing a deterioration of aesthetic qualities of the LED lighting device and easily satisfying the requirements of a performance certification program.

BACKGROUND in recent years, costs incurred for manufacturing a light-emitting diode (LED) have been reduced and credibility of a light-emitting diode (LED) has been improved. Accordingly, technologies in relation to LED are widely applied not only to indoor lighting but also to outdoor lighting.

However, it is difficult to present an electronic circuit for a driver suitable for supplying an adjusted electric current to an LED lighting system.

As an LED light has a low-frequency component, a turn-on section and a turn-off section are repeated at specific intervals. This phenomenon is referred to as a flicker.

A flicker of an LED light cannot be seen by people with their naked eyes but can be seen by cameras that can capture after images at a speed higher than that of the eyes of people.

A flicker of an LED lighting device can occur periodically and can cause eye fatigue to users.

FIG. 1 is a view illustrating a 23W-AC-driven LED lighting device for preventing a flicker of the related art.

FIG. 2 is a circuit diagram illustrating the LED lighting device in FIG. 1. The LED lighting device is provided with an AC power supply 10, a rectifying unit 20, first and second light-emitting units 30, 40, and a series-type switching unit 50.

The first light-emitting unit 30 includes a first LED array (LA1), a first electrolytic capacitor) and a first discharge resistance (RC1), and the second light-emitting unit 40 includes a second LED array (LA2), a second electrolytic capacitor (EC2) and a second discharge resistance (RC2).

FIG. 3 is a graph illustrating a waveform of a sine wave of an AC voltage output from an AC power supply 10 in the LED lighting device in FIG. 2.

FIG. 4 is a graph illustrating a waveform as a result of simulation of electric currents and ripple currents flowing in a first LED array (LAI) in the LED lighting device in FIG. 2.

In fact, an AC voltage cannot be a fixed value.

This is because various types of loads are formed in a commercial AC system and magnitude of an electric voltage of the system can vary at levels of 10 to 20% depending on loading conditions.

It is known that a change in driving currents supplied to an LED load through the AC voltage adversely affects performance of an LED lighting device.

An AC component, as illustrated in FIG. 3, takes the form of a sinusoidal voltage that is twice as high as a frequency of an AC voltage from a main line or a power supply similar to the main line.

An LED that is a diode shows a low differential impedance that is defined as a change rate of a voltage to an electric current in its operation section.

The low differential impedance causes a significant amount of ripple current of the LED when there are voltage ripples.

The ripples are generated at a frequency twice as high as an AC frequency of a main line, r is between 100 Hz and 120 Hz.

According to a study, most healthy adults have sensitivity to the stroboscopic phenomenon caused by a flicker of LED lighting in the above-described range of frequencies.

The flicker is caused when current ripples occur in an LED lighting device.

In light of a direct relationship between optical power (speed of light) and electric current in an LED, the current ripples can cause a flicker of light.

Accordingly, LED technologies are limitedly applied to lighting in households, offices, streets and industries.

In fact, according to a recent study, even when a flicker level is very low, some healthy adults have sensitivity to the stroboscopic phenomenon caused by a flicker.

The study shows that about 75% of healthy adults have sensitivity to the stroboscopic phenomenon due to a 10% flicker that is caused by about 20% of current ripples at a frequency of 100 Hz.

Due to sensitivity to the stroboscopic phenomenon caused by a flicker, LED lighting is not widely used for applications in which comfortable and accurate recognition of movements is an important factor, and applications in which an illuminated scene includes movement, vibration or rotation of an object.

To solve the problem, a dimming device of an LED lamp of the related art using a triac dimmer changes an output voltage corresponding to an amount of changes at a constant ratio even when a phase angle used for determining a dimming range is fixed.

Thus, a flicker has no option but to occur to an LED of the lamp driven by an AC power supply 10.

To allow the LED to emit light, a forward-direction voltage of a predetermined level has to be input. However, the AC voltage is changed at a constant ratio due to the external environment into a voltage lower than or equal to a critical value (a threshold voltage).

The threshold voltage is usually changed in a range of low voltages.

To reduce current ripples and optical flickers, voltage ripples from an AC input driving circuit used to supply a driving current to an LED lighting apparatus need to be reduced.

As a means to achieve the above-described aim, attempts to develop an LED driver circuit that can solve the problem of an optical flicker produced as a result of a periodic change of an AC power supply have been made.

Specifically, capacitance supplied to an output of the power supply device or output near the output value of the power supply device is used to smooth voltage ripples generated by the power supply device, preferably, to lower the voltage ripples to a level of a few percents.

For example, in terms of costs and credibility, an LED lighting apparatus used in streets, offices or industries in the form of a long series-connected string is considered effective, and each string is supplied with a constant direct current by a single driver.

Accordingly, a DC output voltage of the driver needs to be high enough to drive a plurality of LEDs such that each driver guarantees generation of a sufficient amount of optical power from the LED string driven by the driver.

Against this backdrop, an electric capacitor used to smooth voltage ripples from the power supply device has to tolerate a relatively high DC voltage such as 200 V or higher.

This leads to use of an electrolytic capacitor, and the electrolytic capacitor can tolerate a voltage as high as the above described voltage while supplying a high capacitance value of approximately hundreds of microfarads ($\mu F$) unlike other types of capacitors.

The need to lower a voltage ripple to a minimum level results in use of high capacitance.

To this end, a small number of high-value electrolytic capacitors or a large number of low-value electrolytic capacitors may be used.

The number of capacitors used to realize total required capacitance is determined at least partially by a maximum rated ripple current with respect to each capacitor.

However, a small number of high-value electrolytic capacitors or a large number of low-value electrolytic capacitors increase a predicted failure rate of the capacitors. Accordingly, a statistical failure rate of the power supply device is increased.

From this point of view, the number and capacity of electrolytic capacitors required for output from the power supply device of an LED driver are preferably reduced.

In fact, for an LED lighting device in the market, a peak-to-peak value of current ripples in an LED array preferably accounts for less than about 1% of DC currents supplied to the LED array, and, on the basis of the peak-to-peak value, a flicker directly detectable and a flicker quantum stroboscopically detectable are preferably reduced significantly or removed.

A power supply device designed to be used in an LED driver is required to achieve two opposite purposes sought by lighting used in streets, offices and industries.

Preferably, the power supply device supplies a low voltage ripple to minimize an LED current ripple and an optical flicker.

To meet the requirements, a large amount of output from the power supply device has to be used. Accordingly, as illustrated in FIG. 1, four electrolytic capacitors having large volume need to be used.

Operations of a 23W-AC-driven LED lighting device for preventing a flicker of the related art are schematically described with reference to FIGS. 1 to 4.

Electric charge that charges first and second electrolytic capacitors (EC1 and EC2) is discharged through a voltage drop or a resistance in first and second LED arrays (LA1 and LA2). In an initial step of discharge, a large amount of electric currents flow and a large amount of electric charge is discharged.

Accordingly, in a final stage of discharge, electric charge charged in the first and second electrolytic capacitors (EC1 and EC2) is short, and the LED lighting device is driven in a self-discharge state where electric currents flowing in the first and second LED arrays (LA1 and LA2) are rapidly reduced.

As the capacity and volume of the first and second electrolytic capacitors (EC1 and EC2) are too large, a product cannot be implemented when the first and second electrolytic capacitors (EC1 and EC2) are mounted onto a printed circuit board (PCB).

Additionally, a flicker may occur more often at a low power level than a normal power level when brightness is adjusted using a triac dimmer.

Accordingly, a capacitor having a capacity and size larger than a capacitor that satisfies a flicker at a normal power level has to be used to satisfy the standard of a flicker at a low power level.

To actually satisfy 30% of the Energy Star standard of an approximate 23W of an LED lighting device at an AC voltage of 120 V, four capacitors of an internal voltage of 80 V, capacitance of 100 uF, and a diameter of 1.0 mm, a length of 10 mm, and volume of 785 $m^{m2}$ have to be used.

The Energy Star is a program for certifying performance of a product, which is presented by the US government to encourage consumers to use energy efficient products, and is well known for its logo on various electronic devices such as computers, peripheral devices, lighting devices and the like.

Operations of a 23W-AC-driven LED lighting device for preventing a flicker of the related art are specifically described with reference to FIGS. 1 to 4.

For an electrolytic capacitor (ECj) connected in parallel to the LED array (LAj, j=1 or 2), electric currents flowing through a transistor (Qj) in a series-type switching unit 50 are branched into the LED array (LAj), and continue to be charged and discharged in a normal state after a transition period.

A speed of charge and discharge in a normal state is based on a time constant defined by multiplying a dynamic resistance (R_LAj) of each LED array (LAj) by capacitance (C_ECj) of each electrolytic capacitor (ECj).

A fluctuation of a voltage at the time of charge is increased at a ratio of 1-exp (-R_LAj×C_ECj) at a voltage right before the charge, and a fluctuationof a voltage at the time of discharge is decreased at a ratio of exp (-R_LAj×C_ECj) at a voltage right before the discharge.

To acquire the same flicker index using the same number of LED arrays (LAj) that have the same power of 220V and are driven at 110V, the number of LED arrays (LAj) connected in series has to be halved and the LED arrays (LAj) have to be driven in parallel. Accordingly, a resistance has to be halved, a driving current has to be doubled, and a value of capacitance has to be quadrupled.

In this case, as half of the internal voltage can be used, volume of the electrolytic capacitor (ECj) has to be doubled when the LED lighting device is actually implemented.

For example, to reduce a flicker index from 30% to 3% which is one tenth of 30% the capacitance, as described above, has to be ten-folded. Also, the volume has to be ten-folded.

In case power is reduced and brightness is decreased using a triac dimmer, power is supplied for a longer period, and a discharge period is lengthened. Then, more discharge current is decreased by a time constant, and a flicker index is increased.

As a result of simulation of an electric current flowing through a first LED array (LA1) in the LED lighting device of the related art in FIG. 2, percent flicker is measured at 10.5%, as in the waveform of FIG. 5.

However, a large number and capacity of electrolytic capacitors in an LED lighting device result in a deterioration of aesthetic qualities of the LED lighting device, and, in case a plurality of LEDs are turned on at a plurality of positions, a shadow of the electrolytic capacitor can decrease illuminance of the lighting device.

DISCLOSURE

Technical Problems

The present disclosure is directed to an LED lighting device for preventing a flicker that can reduce current ripples generated from an AC power supply of the LED lighting device by adjusting a constant current in a light-emitting unit, thereby making it possible to reduce a flicker without increasing the number and capacity of electrolytic capacitors.

Technical Solutions

An LED lighting device for preventing a flicker according to the present disclosure, includes; a rectifying unit supplied with an AC voltage from an AC power supply, configured to rectify the same and configured to output a direct current; a first light-emitting unit supplied with the direct current, configured to adjust a first constant current and configured to allow a first LED array to emit light; a second light-emitting unit supplied with the adjusted first constant current, configured to adjust a second constant current and configured to allow a second array to emit light; and a series-type switching unit supplied with the direct current and the adjusted first and second constant currents and configured to control deliver of an electric current on the basis of opening and closing of a plurality of transistors built into the series-type switching unit, wherein the supplied direct current and first constant current are supplied by passing through first and second diodes respectively.

The first light-emitting unit of an LED lighting device for preventing a flicker according to the present disclosure, comprising: a first electrolytic capacitor with one side connected to a cathode terminal of the first diode and the other side connected to an anode terminal of the second diode to charge first electric charge; and a first discharge resistance connected in parallel with the first electrolytic capacitor and configured to discharge the charged first electric charge; the first LED array provided with a plurality of LEDs, supplied with a direct current having passed through the first diode and configured to emit light; and a first constant-current adjusting unit with one side connected to an output terminal of the first LED array and the other side connected to an anode terminal of the second diode to adjust and output the first constant current where a gate bias is adjusted.

The first constant-current adjusting unit of an LED lighting device for preventing a flicker according to the present disclosure, comprising: a first field-effect transistor having a drain terminal connected to an output terminal of the first LED array to adjust the gate bias and configured to switch a flow of the first constant current; a first drain resistance with one side connected to a drain terminal of the first field-effect transistor and the other side connected to a gate terminal of the first field-effect transistor to adjust the gate bias; a first current-branch resistance with one side connected to a drain terminal of the first field-effect transistor and the other side connected to a source terminal of the first field-effect transistor to branch a drain current of the first field-effect transistor; a first current-control resistance with one side connected to a source terminal of the first field-effect transistor and the other side connected to an anode terminal of the second diode to control a source current of the first field-effect transistor; a first gate resistance with one side connected to a gate terminal of the first field-effect transistor and the other side connected to an anode terminal of the second diode to adjust the gate bias; and a first gate-voltage-maintenance capacitor connected in parallel with the first gate resistance and configured to keep a first gate voltage constant with respect to a fluctuating first drain voltage of the first field-effect transistor.

The second light-emitting unit of an LED lighting device for preventing a flicker according to the present disclosure, comprising: a second electrolytic capacitor with one side connected to a cathode terminal of the second diode to charge second electric charge; and a second discharge resistance connected in parallel with the second electrolytic capacitor and configured to discharge the charged second electric charge; the second LED array provided with a plurality of LEDs, supplied with a direct current having passed through the second diode and configured to emit light; and a second constant-current adjusting unit with one side connected to an output terminal of the second LED array to adjust and output the second constant current where a gate bias is adjusted.

The second constant-current adjusting unit of an LED lighting device for preventing a flicker according to the present disclosure, comprising: a second field-effect transistor having a drain terminal connected to an output terminal of the second LED array to adjust the gate bias and configured to switch a flow of the second constant current; a second drain resistance with one side connected to a drain terminal of the second field-effect transistor and the other side connected to a gate terminal of the second field-effect transistor to adjust the gate bias; a second current-branch resistance with one side connected to a drain terminal of the second field-effect transistor and the other side connected to a source terminal of the second field-effect transistor to branch a drain current of the second field-effect transistor; a second current-control resistance with one side connected to a source terminal of the second field-effect transistor and the other side connected to the series-type switching unit to control a source current of the second field-effect transistor; a second gate resistance with one side connected to a gate terminal of the second field-effect transistor and the other side connected to the series-type switching unit to adjust the gate bias; and a second gate-voltage-maintenance capacitor connected in parallel with the second gate resistance and configured to keep a second gate voltage constant with respect to a fluctuating second drain voltage of the second field-effect transistor.

The series-type switching unit of an LED lighting device for preventing a flicker according to the present disclosure, comprising: a power-supply resistance, one side of which is connected to the rectifying unit, which is supplied with the direct current and which is supplied with a constant voltage; first to third branch resistances which are connected in series, one side of which is connected to the other side of the power-supply resistance to receive the constant voltage, and the other side of which is grounded to branch the constant voltage; a Zener diode to which an anode terminal is grounded, which is connected in parallel with the first to third branch resistances and which prevents an overvoltage; a first transistor where a gate terminal is connected to a contact point of the first and second branch resistances and where a drain terminal is supplied with the first constant current to be switched; and a second transistor where a gate terminal is connected to a contact point of the second and third branch resistances and where a drain terminal is supplied with the second constant current to be switched, wherein source terminals of the first and second transistors are connected to each other.

The LED lighting device for preventing a flicker according to the present disclosure, further comprising: a current-amount-control resistance, one side of which is commonly connected to source terminals of the first and second transistors and the other side of which is grounded and which controls an amount of current of the series-type switching unit.

Wherein in the first electrolytic capacitor and the first LED array of an LED lighting device for preventing a flicker according to the present disclosure, electric currents flowing in the first transistor are branched into the first LED array, and continue to be charged and discharged in a normal state after a predetermined transition period.

Wherein the first electrolytic capacitor of an LED lighting device for preventing a flicker according to the present disclosure is charged at a speed based on a time constant defined by multiplying a dynamic resistance of the first LED array by capacitance of the first electrolytic capacitor.

Wherein for the first LED array of an LED lighting device for preventing a flicker according to the present disclosure, the gate bias is adjusted in proportion to an average of drain voltages of the first field-effect transistor, is calculated as the first constant current and is discharged.

Wherein the first constant-current-adjusting unit of an LED lighting device for preventing a flicker according to the present disclosure adjusts the first constant current such that a target value of a flicker index is obtained through a fluctuation of the calculated first constant current at a rated voltage of the AC power supply.

Wherein in the second electrolytic capacitor and the second LED array of an LED lighting device for preventing a flicker according to the present disclosure, electric currents flowing in the second transistor are branched into the second LED array, and continue to be charged and discharged in a normal state after a predetermined transition period.

Wherein the second electrolytic capacitor of an LED lighting device for preventing a flicker according to the present disclosure is charged at a speed based on a time constant defined by multiplying a dynamic resistance of the second LED array by capacitance of the second electrolytic capacitor.

Wherein for the second LED array of an LED lighting device for preventing a flicker according to the present disclosure, the gate bias is adjusted in proportion to an average of drain voltages of the second field-effect transistor, is calculated as the second constant current and is discharged.

Wherein the second constant-current-adjusting unit of an LED lighting device for preventing a flicker according to the present disclosure adjusts the second constant current such that a target value of a flicker index is obtained through a fluctuation of the calculated second constant current at a rated voltage of the AC power supply.

An LED lighting device for preventing a flicker according to present disclosure, comprising; a rectifying unit supplied with an AC voltage from an AC power supply, configured to rectify the same and configured to output a direct current; a first light light-emitting unit supplied with the direct current, configured to adjust a first constant current and configured to allow a first LED array to emit light; a second light-emitting unit supplied with the adjusted first constant current, configured to adjust a second constant current and configured to allow a second LED array to emit light; and a series-type switching unit supplied with the direct current and the adjusted first and second constant currents and configured to control deliver of an electric current on the basis of opening and closing of a plurality of transistors built into the series-type switching unit, wherein a drain resistance, a gate resistance, a source resistance of a field-effect transistor built into the first and second light-emitting units are changed to adjust a required flicker index.

Details of other embodiments are set forth in the section of "Best Mode" and the accompanying "drawings".

Advantages and/or features of the disclosure, and a method of achieving the same may be clearly understood from the following embodiments that are specifically described with reference to the accompanying drawings.

The present disclosure, however, may be implemented in various different forms, and should not be construed as being limited only to the embodiments set forth herein. Rather, these embodiments are provided as examples so that the present disclosure will be thorough and complete and that the scope of the disclosure will be fully conveyed to one having ordinary skill in the art to which the disclosure pertains.

The present invention should be defined only by the scope of the appended claims.

Advantageous Effects

According to the present disclosure, the LED lighting device requires a small number and capacity of electrolytic capacitors, thereby preventing a deterioration of aesthetic qualities, and, even when a plurality of LEDs are turned on at a plurality of positions, causes no shadow of the electrolytic capacitor, thereby improving illuminance of the lighting device.

Further, the LED lighting device prevents a flicker generated periodically, thereby making it possible to reduce eye fatigue of a user who is exposed to the LED lighting device for a long period and is used in households, offices, streets and industries.

LED lighting may be widely adopted in applications in which comfortable and accurate recognition of movements is an important factor and in applications which include movement, vibration and rotation of an object.

Further, in an LED driving apparatus for preventing a flicker, a failure rate of the electrolytic capacitor and LED lighting-emitting unit is decreased, thereby ensuring improved performance of a product and easily satisfying the standard of ENERGY STAR that is a program for certifying performance of an LED lighting device.

DESCRIPTION OF THE DRAWINGS

FIG. 1 is a view illustrating a 23W-AC-driven LED lighting device for preventing a flicker of the related art.

FIG. 2 is a circuit diagram illustrating the LED lighting device in FIG. 1.

FIG. 3 is a graph illustrating a waveform of a sine wave of an AC voltage output from an AC power supply 10 in the LED lighting device in FIG. 2.

FIG. 4 is a graph illustrating a waveform as a result of simulation of electric currents and ripple currents flowing in a first LED array (LA1) in the LED lighting device in FIG. 2.

FIG. 5 is a graph illustrating a flicker waveform measured in the LED lighting device in FIG. 2.

FIG. 6 is a view illustrating a 23W-AC-driven LED lighting device for preventing a flicker according to the present disclosure.

FIG. 7 is a circuit diagram illustrating the LED lighting device in FIG. 6.

FIG. 8 is a graph illustrating a flicker waveform measured in the LED lighting device in FIG. 7.

FIG. 9 compares the picture taken with the camera in the state in which the LED lighting device of FIG. 7 emits light compared to the prior art.

BEST MODE

Below, a preferred embodiment of the present disclosure is described with reference to the accompanying drawings.

All the terms and words used herein may not have the same meaning as those defined in commonly used dictionaries and their concept may be properly defined by the applicant such that the present disclosure is described in the base way possible.

Further, the terms and words should be interpreted as having a meaning and concept that are consistent with those commensurate with the technical spirit of the disclosure.

The terms and words set forth herein are used only to describe preferred embodiments of the disclosure and are not intended to limit the disclosure.

It should be understood that the terms and words are defined considering various functions of the disclosure.

In this specification, the singular forms "a", "an" and "the" are intended to include the plural forms as well, unless explicitly indicated otherwise.

Similarly, the plural forms are intended to include the singular forms as well.

Throughout the specification, unless explicitly described to the contrary, the term "comprise" should imply the inclusion of any other component but not the exclusion of any other component.

When a component is described as "being in another component or being connected to another component", the component may be directly connected to another component or may contact another component.

When a component is described as being spaced a predetermined distance apart from another component, the component may be fixed or connected to another component through a third component or a third means.

Further, description in relation to the third component or third means may be omitted.

When a component is described as "being directly connected" or "being directly connected" to another component, a third component or a third means is not placed between the component and another component.

Likewise, expressions for describing a relationship between components such as "between" and "directly between", or "adjacent to" and "directly adjacent to" and the like should be interpreted in the above-described manner.

Further, in this specification, the terms "one surface", "the other surface", "one side", "the other side", "first", "second" and the like are used to distinguish one component from another component explicitly.

However, the component is not limited by the terms.

In this specification, spacial terms such as "up", "down", "left", "right" and the like denote a relative position of the component in the drawing.

Unless specifically defined, the spacial terms do not denote an absolute position of the component.

Further, the terms such as "unit", "part", "module", "device" and the like set forth herein denote a unit that may perform one or more functions or operations.

The "unit", "part", "module", "device" and the like may be implemented as hardware or software or a combination of hardware and software.

In this specification, the size, position, coupling relationship and the like of each component illustrated in the accompanying drawings may be partially exaggerated, reduced or omitted for convenience of description or clarity in the spirit of the disclosure. Accordingly, a proportion or a scale may not be strict.

Further, in describing the present disclosure, configurations, for example, well-known technologies including related arts will not be specifically described if they are deemed to make the gist of the disclosure unnecessarily vague.

FIG. 6 is a view illustrating a 23W-AC-driven LED lighting device for preventing a flicker according to the present disclosure.

FIG. 7 is a circuit diagram illustrating the LED lighting device in F 6. The LED lighting device is provided with an AC power supply 10, a rectifying unit 20, first and second light-emitting units 100, 200, first and second diodes (D1 and D2) and a series-type switching unit 50.

The first light-emitting unit 100 includes a first LED array (LA1), a first electrolytic capacitor (EC1), a first discharge resistance (RC1) and a first constant-current adjusting unit 150, and the second light-emitting unit 200 includes a second LED array (LA2), a second electrolytic capacitor (EC2), a second discharge resistance (RC2) and a second constant-current adjusting unit 250.

The first constant-current adjusting unit 150 is provided with a first drain resistance (RT1D), a first gate resistance (RT1G), a first gate-voltage-maintenance capacitor (CT1G), a first current-control resistance (RT1S) and a first current-branch resistance (RTM1), and the second constant-current adjusting unit 250 is provided with a second drain resistance (RT2D), a second gate resistance (RT2G), a second gate-voltage-maintenance capacitor (CT2G), a second current-control resistance (RT2S) and a second current-branch resistance (RTM2).

The series-type switching unit 50 includes a power-supply resistance (R1), a Zener diode (Z1), gate-voltage-branch resistances (R2, R3 and R4), and first and second transistors (Q1 and Q2).

FIG. 8 is a graph illustrating a flicker waveform measured in the LED lighting device in FIG. 7.

FIG. 9 compares the picture taken with the camera in the state in which the LED lighting device of FIG. 7 emits light compared to the prior art.

The structure and function of each component of the LED lighting device for preventing a flicker according to the present disclosure are schematically described as follows with reference to FIGS. 6 to 9.

A rectifying unit 20 is supplied with an AC voltage from an AC power supply 10 and rectifies the same, to output a direct current.

A first light-emitting unit 100 is supplied with the direct current from the rectifying unit 20 and adjusts a first constant current, to allow a first LED array (LA1) to emit light.

A second light-emitting unit 200 is supplied with the adjusted first constant current from the first light-emitting unit 00 and adjusts a second constant current, to allow a second LED array (LA2) to emit light.

A series-type switching unit 50 is supplied with the direct current from the rectifying unit 20 and the adjusted first and second constant currents respectively from the first and second light-emitting units 100, 200, and controls delivery of an electric current on the basis of opening and closing of a plurality of transistors (Q1 and Q2) built into the series-type switching unit.

One side of a current-amount-control resistance (RS) is commonly connected to a source terminal of first and second transistors (Q1 and Q2) and the other side is grounded, to control a current amount of the series-type switching unit 50.

The direct current, supplied to the first light-emitting unit 100, is supplied by passing through a first diode (D1), and the first constant current, supplied to the second light-emitting unit 200, is supplied by passing through a second diode (D2).

The structure and function of each component of the first light-emitting unit 100 in the LED lighting device for preventing a flicker according to the present disclosure are specifically described as follows with reference to FIGS. 6 to 9.

One side of a first electrolytic capacitor (EC1) is connected to a cathode terminal of a first diode (D1), and the other side is connected to an anode terminal of a second diode (D2), to charge first electric charge.

A first discharge resistance (RC1) is connected in parallel with the first electrolytic capacitor (EC1) to discharge the charged first electric charge.

The first LED array (LA1) is provided with a plurality of LEDs (not illustrated), and is supplied with a direct current to emit light.

One side of a first constant-current adjusting unit 150 is connected to an output terminal of the first LED array (LA1), and the other side is connected to the anode terminal of the second diode (D2), to adjust and output the first constant current where a gate bias is adjusted.

The structure and function of each component of the first constant-current adjusting unit 150 in the LED lighting device for preventing a flicker according to the present disclosure are specifically described as follows with reference to FIGS. 6 to 9.

One side of a first field-effect transistor (T1) is connected to an output terminal of a first LED array (LA1) to adjust a gate bias, and switches a flow of a first constant current.

One side of a first drain resistance (RT1D) is connected to a drain terminal of the first field-effect transistor (T1), and the other side is connected to a gate terminal of the first field-effect transistor (T1), to adjust a gate bias.

One side of a first current-branch resistance (RTM1) is connected to the drain terminal of the first field-effect transistor (T1), and the other side is connected to a source terminal of the first field-effect transistor (T1), to branch a drain current of the first field-effect transistor (T1).

One side of a first current-control resistance (RT1S) is connected to the source terminal of the first field-effect transistor (T1), and the other side is connected to the anode terminal of the second diode (D2), to control a source current of the first field-effect transistor (T1).

One side of a first gate resistance (RT1G) is connected to the gate terminal of the first field-effect transistor (T1), and the other side is connected to the anode terminal of the second diode (D2), to adjust a gate bias.

A first gate-voltage-maintenance capacitor (CT1G) is connected in parallel with the first gate resistance (RT1G) to keep a first gate voltage constant with respect to a fluctuating first drain voltage of the first field-effect transistor (T1).

The structure and function of each component of the second light-emitting unit 200 in the LED lighting device for preventing a flicker according to the present disclosure are specifically described as follows with reference to FIGS. 6 to 9.

One side of a second electrolytic capacitor (EC2) is connected to a cathode terminal of a second diode (D2) to charge second electric charge.

A second discharge resistance (RC2) is connected in parallel with the second electrolytic capacitor (EC2) to discharge the charged second electric charge.

A second LED array (LA2) is provided with a plurality of LEDs (not illustrated) and is supplied with a direct current to emit light.

One side of a second constant-current adjusting unit 250 is connected to an output terminal of the second LED array (LA2) to adjust and output a second constant current where a gate bias is adjusted.

The structure and function of each component of the second constant-current adjusting unit 250 in the LED lighting device for preventing a flicker according to the present disclosure are specifically described as follows with reference to FIGS. 6 to 9.

One side of a second field-effect transistor (T2) is connected to an output terminal of a second LED array (LA2) to adjust a gate bias, and switches a flow of a second constant current.

One side of a second drain resistance (RT2D) is connected to a drain terminal of the second field-effect transistor (T2), and the other side is connected to a gate terminal of the second field-effect transistor (T2) to adjust a gate bias.

One side of a second current-branch resistance (RTM2) is connected to the drain terminal of the second field-effect transistor (T2), and the other side is connected to a source terminal of the second field-effect transistor (12), to branch a drain current of the second field-effect transistor (12).

One side of a second current-control resistance (RT2S) is connected to the source terminal of the second field-effect transistor (T2), and the other side is connected to a series-type switching unit 50, to control a source current of the second field-effect transistor (12).

One side of a second gate resistance (RT2G) is connected to the gate terminal of the second field-effect transistor (T2), and the other side is connected to an anode terminal of a second diode (D2), to adjust a gate bias.

A second gate-voltage-maintenance capacitor (CT2G) is connected in parallel with the second gate resistance (RT2G) to keep a second gate voltage constant with respect to a fluctuating second drain voltage of the second field-effect transistor (T2).

The structure and function of each component of the series-type switching unit 50 in the LED lighting device for preventing a flicker according to the present disclosure are specifically described as follows with reference to FIGS. 6 to 9.

One side of a power-supply resistance (R1) is connected to a rectifying unit 20, supplied with a direct current and supplied with a constant voltage.

One side of first to third branch resistances (R2, R3 and R4) is connected to the other side of the power-supply resistance (R1) to receive a constant voltage. Additionally, the first to third branch resistances (R2, R3 and R4) are connected in series with each other and the other sides are grounded, to branch the received constant voltage.

An anode terminal is grounded to a Zener diode (Z1), and the Zener diode (Z1) is connected in parallel with the first to third branch resistances (R2, R3 and R4) to prevent an overvoltage.

For a first transistor (Q1), a gate terminal is connected to a contact point of the first and second branch resistances (R2 and R3), and a drain terminal is supplied with a first constant current to be switched.

For a second transistor (Q2), a gate terminal is connected to a contact point of the second and third branch resistances (R3 and R4), and a drain terminal is supplied with a second constant current to be switched.

Operations of the LED lighting device for preventing a flicker according to an embodiment are specifically described as follows with reference to FIGS. 6 to 9.

For an LED array (LAj, j=1 or 2) and an electrolytic capacitor (ECj), electric currents flowing in a transistor (Qj) are branched into the LED array (LAj), and continue to be charged and discharged in a normal state after a transit period.

A speed of charge in a normal state is based on a time constant defined by multiplying a dynamic resistance of each LED array (LAj) by capacitance (C_ECj) of each electrolytic capacitor (ECj), like that of the related art.

However, discharge is based on a value of a constant current, which is proportional to an average of drain voltages, of a constant current circuit including the field-effect transistor (Tj) disclosed in the present disclosure.

When the gate bias (V_Tj) of the field-effect transistor (Tj) is adjusted through the drain resistance (RTjD), the gate resistance (RTjG), and the gate-voltage-maintenance capacitor (CTjG), a constant current that flows from a drain of the field-effect transistor (Tj) flowing through the source resistance (RTjS) to a source is calculated as (VG_Tj−VT_Tj)/RTjS.

Herein, VG_Tj and VT_Tj are respectively a gate voltage and a threshold voltage of the field-effect transistor (Tj).

The gate voltage (VG_Tj) of the field-effect transistor (Tj) is a voltage that is branched by the drain voltage (VD_Tj) of the field-effect transistor (Tj) and is calculated on the basis of the following formula.

$$VG\_Tj = VD\_Tj \times RG\_Tj/(RG\_Tj+RD\_Tj) \times \alpha \quad \text{[Formula 1]}$$

In the formula, a, which is a factor when a is turned into a constant by a gate-voltage-maintenance capacitor (CrjG), may be a value smaller than 1.

For example, in the case of an electric-wave-rectification sine function, in a fluctuation of a drain voltage, α is 2/π. In fact, however, α is about 0.64 that is a little different from 2/π. In the case of a triangle-wave-linear function, in the fluctuation of a drain voltage, α is ½. In fact, however, α is about 0.5 that is a little different from ½.

In actual application, a fluctuation of electric currents flowing to the field-effect transistor (Tj) is adjusted such that a desired target value of a flicker index is acquired at a slightly high power voltage considering a constant voltage or a margin.

In this case, even when the number of LED arrays (LAj) connected in series is halved and driven in parallel to acquire the same flicker index and the same luminous efficiency using the same number of LED arrays (LAj) that have the same power of 220V and are driven at 110V, a drain resistance (RTjD), a gate resistance (RTjG) and a source resistance (RTjS) of the field-effect transistor (Tj) are respectively or entirely adjusted to acquire a desired flicker index.

Accordingly, a value of capacitance may be doubled and an internal voltage may be halved. In this case, there is no change in volume of an electrolytic capacitor (ECj) when the LED lighting device is actually implemented.

Further, even when the same electrolytic capacitor (ECj) is used while capacitance is ten-folded as in the related art, a flicker index, for example, may be adjusted to 3% that is one tenth of 30% by adjusting a resistance (RTjD, RTjG and RTjS) of the transistor.

In case power is reduced and brightness is decreased using a dimmer, power is supplied for a longer period. However, as described above, a gate voltage of the transistor is lowered in the constant current circuit of the present disclosure, and a set value of the constant current is also lowered. Accordingly, a flicker is not increased.

As illustrated in FIG. 9, almost no flicker occurs when the AC-driven LED lighting device according to the present disclosure emits light unlike when an AC-driven LED lighting device to which a flicker reduction technology is not applied emits light (a) and when an AC-driven LED lighting device for reducing a flicker according to the related art emits light (b).

The present disclosure, as described above, provides an LED lighting device for preventing a flicker a reduces a current ripple produced from an AC power supply of the LED lighting device by adjusting a constant current in the light-emitting unit, thereby preventing a flicker without increasing the number and capacity of electrolytic capacitors.

As the number and capacity of electrolytic capacitors do not need to be increased in the LED lighting device, a deterioration of aesthetic qualities of the LED lighting device is prevented. Additionally, as shadows of the electrolytic capacitors do not fall even when a plurality of LEDs are turned on at a plurality of positions, illuminance of the lighting device is improved.

Further, as a flicker that is generated periodically in the LED lighting device is prevented, thereby reducing eye fatigue of a user who is exposed to the LED lighting device for a long period and extending the applicability of the LED lighting device to lighting in households, offices, streets and industries.

LED lighting may be widely adopted in applications in which comfortable and accurate recognition of movements is an important factor and applications which include movement, vibration or rotation of an object.

Further, an LED driving apparatus for preventing a flicker, a failure rate of the electrolytic capacitor and LED lighting-emitting unit is decreased, thereby ensuring improved performance of a product and easily satisfying the standard of ENERGY STAR that is a program for certifying performance of an LED lighting device.

The present disclosure has been described with reference to various preferred embodiments. However, various embodiments described in the section of "Best Mode" are provided only as examples. It will be understood that one having ordinary skill in the art to which the disclosure pertains may make various modifications or equivalents of the disclosure from the above description.

Further, the present disclosure may be implemented in various different forms, and should not be construed as being limited to the embodiments set forth herein. Rather, these embodiments are provided as examples to make the present disclosure thorough and complete and to fully convey the subject matter of the present disclosure to one having ordinary skill in the art to which the disclosure pertains. The present disclosure should be defined only according to the appended claims.

The invention claimed is:

1. An LED lighting device for preventing a flicker, comprising:
 a rectifying unit supplied with an AC voltage from an AC power supply, configured to rectify the same and configured to output a direct current;

a first light-emitting unit supplied with the direct current, configured to adjust a first constant current and configured to allow a first LED array to emit light;

a second light-emitting unit supplied with the adjusted first constant current, configured to adjust a second constant current and configured to allow a second LED array to emit light; and a series-type switching unit supplied with the direct current and the adjusted first and second constant currents and configured to control deliver of an electric current on the basis of opening and closing of a plurality of transistors built into the series-type switching unit, wherein the supplied direct current and first constant current are supplied by passing through first and second diodes respectively, wherein the first light-emitting unit comprises:
a first electrolytic capacitor with one side connected to a cathode terminal of the first diode and the other side connected to an anode terminal of the second diode to charge first electric charge;
a first discharge resistance connected in parallel with the first electrolytic capacitor and configured to discharge the charged first electric charge;
the first LED array provided with a plurality of LEDs, supplied with a direct current having passed through the first diode and configured to emit light; and
a first constant-current adjusting unit with one side connected to an output terminal of the first LED array and the other side connected to the anode terminal of the second diode to adjust and output the first constant current where a gate bias is adjusted, and wherein the first constant-current adjusting unit, comprises:
a first field-effect transistor having a drain terminal connected to the output terminal of the first LED array to adjust the gate bias and configured to switch a flow of the first constant current; and
a first current-branch resistance with one side connected to the drain terminal of the first field-effect transistor and the other side connected to a source terminal of the first field-effect transistor to branch a drain current of the first field-effect transistor.

2. The LED lighting device for preventing a flicker of claim 1, the first constant-current adjusting unit, further comprising:
a first drain resistance with one side connected to a drain terminal of the first field-effect transistor and the other side connected to a gate terminal of the first field-effect transistor to adjust the gate bias;
a first current-control resistance with one side connected to a source terminal of the first field-effect transistor and the other side connected to an anode terminal of the second diode to control a source current of the first field-effect transistor;
a first gate resistance with one side connected to a gate terminal of the first field-effect transistor and the other side connected to an anode terminal of the second diode to adjust the gate bias; and
a first gate-voltage-maintenance capacitor connected in parallel with the first gate resistance and configured to keep a first gate voltage constant with respect to a fluctuating first drain voltage of the first field-effect transistor.

3. The LED lighting device for preventing a flicker of claim 1, the second light-emitting unit, comprising:

a second electrolytic capacitor with one side connected to a cathode terminal of the second diode to charge second electric charge; and
a second discharge resistance connected in parallel with the second electrolytic capacitor and configured to discharge the charged second electric charge;
the second LED array provided with a plurality of LEDs, supplied with a direct current having passed through the second diode and configured to emit light; and
a second constant-current adjusting unit with one side connected to an output terminal of the second LED array to adjust and output the second constant current where a gate bias is adjusted.

4. The LED lighting device for preventing a flicker of claim 3, the second constant-current adjusting unit, comprising:
a second field-effect transistor having a drain terminal connected to an output terminal of the second LED array to adjust the gate bias and configured to switch a flow of the second constant current;
a second drain resistance with one side connected to a drain terminal of the second field-effect transistor and the other side connected to a gate terminal of the second field-effect transistor to adjust the gate bias;
a second current-branch resistance with one side connected to a drain terminal of the second field-effect transistor and the other side connected to a source terminal of the second field-effect transistor to branch a drain current of the second field-effect transistor;
a second current-control resistance with one side connected to a source terminal of the second field-effect transistor and the other side connected to the series-type switching unit to control a source current of the second field-effect transistor;
a second gate resistance with one side connected to a gate terminal of the second field-effect transistor and the other side connected to the series-type switching unit to adjust the gate bias; and
a second gate-voltage-maintenance capacitor connected in parallel with the second gate resistance and configured to keep a second gate voltage constant with respect to a fluctuating second drain voltage of the second field-effect transistor.

5. The LED lighting device for preventing a flicker of claim 1, the series-type switching unit, comprising:
a power-supply resistance, one side of which is connected to the rectifying unit, which is supplied with the direct current and which is supplied with a constant voltage;
first to third branch resistances which are connected in series, one side of which is connected to the other side of the power-supply resistance to receive the constant voltage, and the other side of which is grounded to branch the constant voltage;
a Zener diode to which an anode terminal is grounded, which is connected in parallel with the first to third branch resistances and which prevents an overvoltage;
a first transistor where a gate terminal is connected to a contact point of the first and second branch resistances and where a drain terminal is supplied with the first constant current to be switched; and
a second transistor where a gate terminal is connected to a contact point of the second and third branch resistances and where a drain terminal is supplied with the second constant current to be switched,
wherein source terminals of the first and second transistors are connected to each other.

6. The LED lighting device for preventing a flicker of claim 5, the LED lighting device, further comprising:
a current-amount-control resistance, one side of which is commonly connected to source terminals of the first and second transistors and the other side of which is grounded and which controls an amount of current of the series-type switching unit.

7. The LED lighting device for preventing a flicker of claim 5, wherein in the first electrolytic capacitor and the first LED array, electric currents flowing in the first transistor are branched into the first LED array, and continue to be charged and discharged in a normal state after a predetermined transition period.

8. The LED lighting device for preventing a flicker of claim 7, wherein the first electrolytic capacitor is charged at a speed based on a time constant defined by multiplying a dynamic resistance of the first LED array by capacitance of the first electrolytic capacitor.

9. The LED lighting device for preventing a flicker of claim 2, wherein for the first LED array, the gate bias is adjusted in proportion to an average of drain voltages of the first field-effect transistor, is calculated as the first constant current and is discharged.

10. The LED lighting device for preventing a flicker of claim 9, wherein the first constant-current-adjusting unit adjusts the first constant current such that a target value of a flicker index is obtained through a fluctuation of the calculated first constant current at a rated voltage of the AC power supply.

11. The LED lighting device for preventing a flicker of claim 5, in the second electrolytic capacitor and the second LED array, electric currents flowing in the second transistor are branched into the second LED array, and continue to be charged and discharged in a normal state after a predetermined transition period.

12. The LED lighting device for preventing a flicker of claim 11, wherein the second electrolytic capacitor is charged at a speed based on a time constant defined by multiplying a dynamic resistance of the second LED array by capacitance of the second electrolytic capacitor.

13. The LED lighting device for preventing a flicker of claim 4, wherein for the second LED array, the gate bias is adjusted in proportion to an average of drain voltages of the second field-effect transistor, is calculated as the second constant current and is discharged.

14. The LED lighting device for preventing a flicker of claim 13, wherein the second constant-current-adjusting unit adjusts the second constant current such that a target value of a flicker index is obtained through a fluctuation of the calculated second constant current at a rated voltage of the AC power supply.

15. An LED lighting device for preventing a flicker, comprising:
a rectifying unit supplied with an AC voltage from an AC power supply, configured to rectify the same and configured to output a direct current;
a first light-emitting unit supplied with the direct current, configured to adjust a first constant current and configured to allow a first LED array to emit light;
a second light-emitting unit supplied with the adjusted first constant current, configured to adjust a second constant current and configured to allow a second LED array to emit light; and
a series-type switching unit supplied with the direct current and the adjusted first and second constant currents and configured to control deliver of an electric current on the basis of opening and closing of a plurality of transistors built into the series-type switching unit,
wherein a drain resistance, a gate resistance, a source resistance of a field-effect transistor built into the first and second light-emitting units are changed to adjust a required flicker index,
wherein the first light-emitting unit comprises:
a first electrolytic capacitor with one side connected to a cathode terminal of the first diode and the other side connected to an anode terminal of the second diode to charge first electric charge; and
a first discharge resistance connected in parallel with the first electrolytic capacitor and configured to discharge the charged first electric charge;
the first LED array provided with a plurality of LEDs, supplied with a direct current having passed through the first diode and configured to emit light; and
a first constant-current adjusting unit with one side connected to an output terminal of the first LED array and the other side connected to the anode terminal of the second diode to adjust and output the first constant current where a gate bias is adjusted, and
wherein the first constant-current adjusting unit comprises:
a first field-effect transistor having a drain terminal connected to the output terminal of the first LED array to adjust the gate bias and configured to switch a flow of the first constant current;
a first drain resistance with one side connected to the drain terminal of the first field-effect transistor and the other side connected to a gate terminal of the first field-effect transistor to adjust the gate bias;
a first current-branch resistance with one side connected to the drain terminal of the first field-effect transistor and the other side connected to a source terminal of the first field-effect transistor to branch a drain current of the first field-effect transistor;
a first current-control resistance with one side connected to the source terminal of the first field-effect transistor and the other side connected to the anode terminal of the second diode to control a source current of the first field-effect transistor;
a first gate resistance with one side connected to the gate terminal of the first field-effect transistor and the other side connected to the anode terminal of the second diode to adjust the gate bias; and
a first gate-voltage-maintenance capacitor connected in parallel with the first gate resistance and configured to keep a first gate voltage constant with respect to a fluctuating first drain voltage of the first field-effect transistor.

\* \* \* \* \*